May 8, 1951          P. G. CHAVEZ          2,551,583
WHIRL-MIXER
Filed Feb. 9, 1948
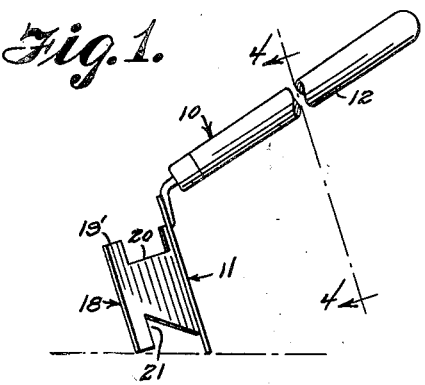
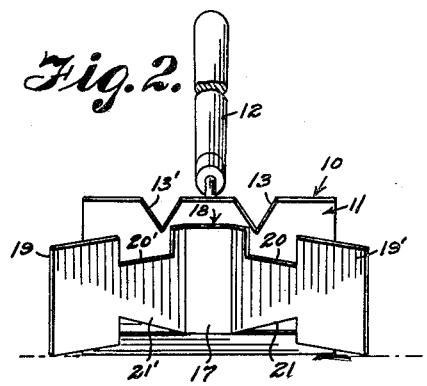
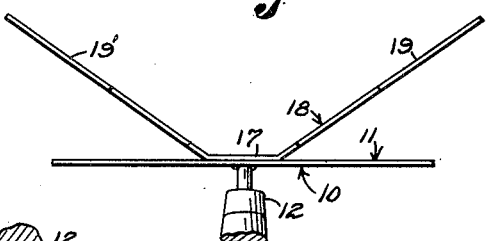
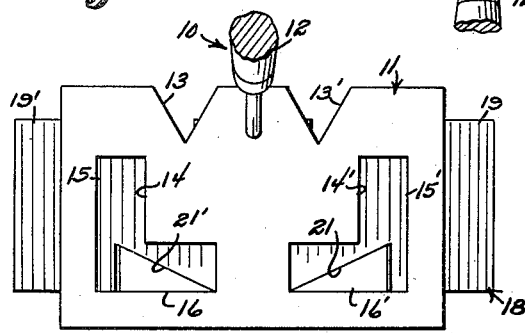
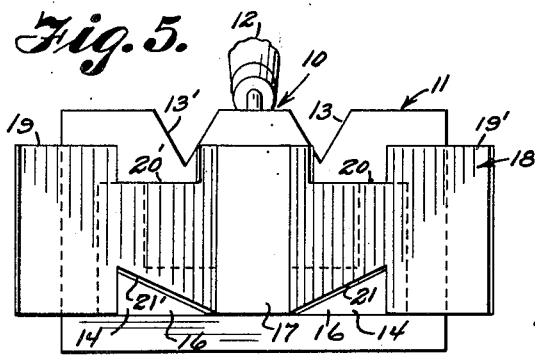
INVENTOR.
Patrico G. Chavez
BY Victor J. Evans & Co.
ATTORNEYS

UNITED STATES PATENT OFFICE 2,551,583

WHIRL MIXER

Patricio G. Chavez, Douglas, Ariz.

Application February 9, 1948, Serial No. 7,171

1 Claim. (Cl. 259—145)

This invention relates to a mixing hoe for dry or wet mixing of mortar for masonry work.

An object of the invention is to provide a hoe which will create a whirling action of dry or wet mortar during the mixing thereof, which shortens and expedites the mixing job.

When mixing wet mortar with the conventional mixing hoe, the water in the mortar will run off to both sides of the hoe while the mortar will be dragged forward without the water properly penetrating the mortar. Thus more work is required to thoroughly mix the water in the mortar.

The hoe embodying the present invention is so constructed that the water will more thoroughly mix with the mortar since it always follows along with the mortar, therefore, more quickly and more thoroughly mixing the mortar and water into a workable mixture.

With the above and other objects and advantages in view, the invention consists of the novel details of construction, arrangement and combination of parts more fully hereinafter described, claimed and illustrated in the accompanying drawing in which:

Figure 1 is a side elevational view of an embodiment of the invention;

Figure 2 is a perspective view thereof;

Figure 3 is a top plan view thereof;

Figure 4 is a front elevational view of one form of the invention on the line 4—4 of Figure 1;

Figure 5 is a rear elevational view of Figure 4.

Referring more in detail to the drawing, the form of the mixing hoe shown in Figures 1 to 5, inclusive, will be generally designated by the numeral 10.

Considering the direction of travel of the mixing hoe 10, it will be shown as comprising a front plate or blade 11 which is rectangular in shape and has secured to its front surface, centrally thereof, adjacent the top edge thereof, a shank of an angularly positioned handle 12. Formed in the top edge of the blade 11 on opposite sides of the handle 12 and in spaced relation thereto, are the V-shaped notches 13 and 13' respectively. The plate 11 also has the L-shaped cutouts 14 and 14' respectively formed therein, so that the vertical portion 15 of the cutout 14 is parallel to and spaced from one vertical edge of the blade 11, while the horizontal portion 16 of the cutout 14 is parallel to and spaced from the bottom horizontal edge of the plate 11. The cutout 14' is so positioned that the vertical portion 15' is parallel to and spaced from the opposite vertical edge of the plate 11, while the horizontal portion 16' of the cutout 14' is parallel to and spaced from the bottom horizontal edge of the plate 11. The inner ends of the horizontal portions of the cutouts are spaced from each other, but extend toward each other, so that the inner ends lie inward of the apexes of the V-shaped notches 13 and 13' respectively.

Secured to the rear surface of the plate 11 intermediate of the apexes of the notches 13 and 13', in alinement with the point of attachment of the handle 12, is the flat portion 17 of the rear plate 18. The portion 17 has formed integrally therewith, the rearwardly inclined wing portions 19 and 19' respectively, which, by their angle of inclination, are spaced from the rear surface of the plate 11. The plate 18 is of a length to have the ends of the wing portions extend beyond the vertical edges of the plate 11, and the upper edges of the wing portion are each provided with a rectangular shaped notch 20 and 20' respectively. The lower edges of the wing portions are each provided with a substantial triangular shaped notch 21 and 21', the apexes of which extend toward the straight portion 17. Therefore, the rear plate 18 is approximately H-shaped in formation.

It is the formation of the front plate with its notches and cutouts and the rear plate with its wing portions, having their notches, that constitutes the main advantages of the invention and provides a whirling action of the motor during the mixing thereof.

As the hoe is drawn toward the operator thereof, the material passes through the horizontal portions of the cutouts 14 and 14' and the notches 21 and 21', as shown in Figure 4. The material passing around the vertical edges of the front plate 11 will drop on top of the material passing through the horizontal portions of the cutouts 14 and 14', so that both the material passing around and through the plate 11 will be mixed as they pass through the notches 21 and 21'. At the same time, material is passing through the V-shaped notches in the plate 11 to fall on the other material, so that all three sources of material are mixed as they pass through one outlet, namely the notches 21 and 21'. When the material reaches a point level with or above the notches 20 and 20', the material will flow through the notches to be mixed with the material passing through notches 21 and 21'. The water, instead of all flowing to the outside of the plate 11, will pass through the cutouts and notches and some will be caught by the outer ends of the wings so that more water will mix and penetrate with the mortar than would do so if a conventional mixing hoe were used.

There has thus been provided, a mixing hoe which, it is believed, will attain the objects of the invention, and it is believed that from the foregoing description, the construction, operation and use thereof will be apparent to those skilled in the art.

It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a concrete mixing implement, the combination which comprises a handle having a metal shank on one end, a transversely disposed blade extended downwardly from the handle and secured to the handle by the shank, said blade positioned perpendicular to the handle and having openings therethrough and also having notches in the upper edge, and a pair of diagonally positioned wings extended rearwardly and outwardly from points spaced from the center of the blade and said wings having triangular shaped recesses in the lower edges and rectangular shaped recesses in the upper edges providing rectangular shaped baffles on the ends thereof.

PATRICIO G. CHAVEZ.

REFERENCES CITED

The following references are of record in the file of this patent:

UNITED STATES PATENTS

| Number | Name | Date |
| --- | --- | --- |
| 332,350 | Kretsinger | Dec. 15, 1885 |
| 565,379 | Dickson | Aug. 4, 1896 |
| 1,186,657 | Hammond | June 13, 1916 |
| 1,282,930 | Pike | Oct. 29, 1918 |
| 1,286,779 | Rhomberg | Dec. 3, 1918 |
| 1,302,290 | Black et al. | Apr. 29, 1919 |
| 1,699,933 | Urban | Jan. 22, 1929 |